Nov. 15, 1927.
J. C. ABEL
1,649,436
BOLT FITTING
Filed June 29, 1926
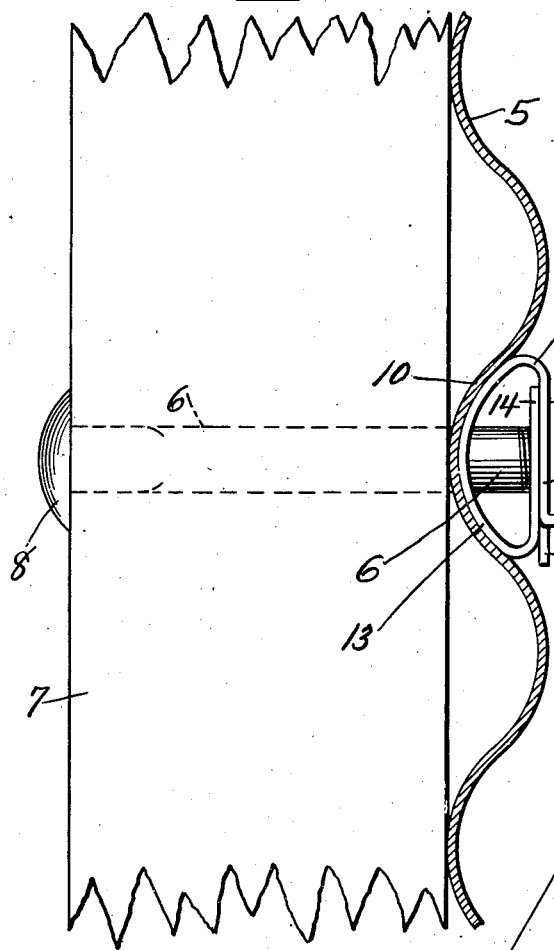
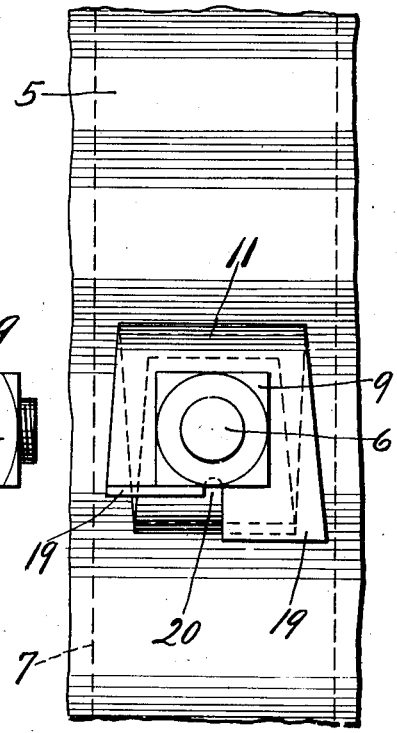
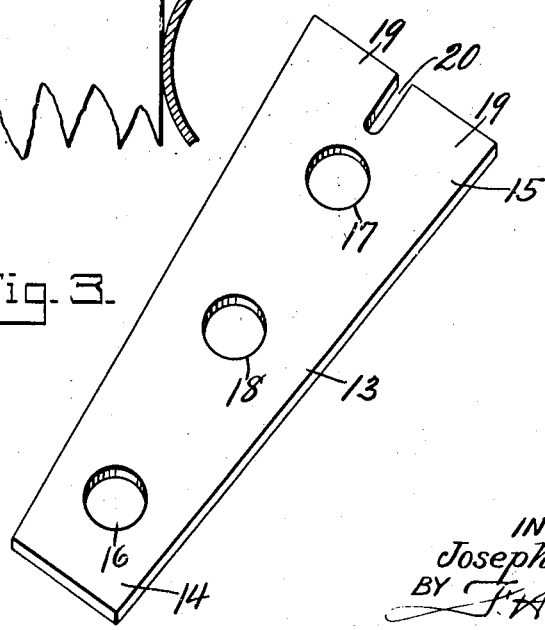
INVENTOR
Joseph C. Abel
BY
ATTORNEY Patented Nov. 15, 1927.

1,649,436

UNITED STATES PATENT OFFICE.

JOSEPH C. ABEL, OF WESTWOOD, NEW JERSEY, ASSIGNOR TO AMERICAN CAR AND FOUNDRY COMPANY, OF NEW YORK, N. Y., A CORPORATION OF NEW JERSEY.

BOLT FITTING.

Application filed June 29, 1926. Serial No. 119,381.

In the drawing, Fig. 1 shows an application of my invention to a bolt securing a corrugated metal sheet to a supporting structure or member, the metal sheet appearing in cross-section transversely of the corrugations.

Fig. 2 is a side or plan view, showing my device and the associated bolt parts;

Fig. 3 is a perspective view of a blank that may be used in fabricating my device.

My invention relates to bolt fittings and the like, useful as washers or as fillers under bolt head members, and as nut-locks. In suitable forms of embodiment, such as here shown and described, the invention is especially well adapted and advantageous for use with corrugated sheets, such as are used in railway car construction and in building construction for both roofs and walls. Besides simplicity, cheapness of manufacture, convenience and quickness in use, protection against stripping of threads, security and good looks in service, the particular form of device here shown has the advantage of minimum obstruction of the hollows or corrugations in which it is used, so that it does not materially obstruct run-off of rain-water or cause rust and leakage at the bolts.

Figs. 1 and 2 show a sheet of corrugated metal 5 (such as galvanized sheet iron) secured by a bolt 6 to any suitable supporting member or structure 7. The bolt 6 has a rounded head 8 at one end, and at the other end, beyond the corrugated sheet 5, an angular head 9, shown as a nut screwed on the threaded shank of the bolt. The bolt 6 extends through a hollow or trough 10 of the corugations as they appear from the side on which the head member or nut 9 is located, so that the corresponding "crest" at the other side may bear against this support 7.

In the present instance, my device 11 is employed as a combined washer and filler, for seating the nut 9 in the hollow of the corrugation 10 and transmitting and distributing its pressure to the corrugated sheet 5 around the bolt. As shown in Fig. 1, the device 11 has the form of a somewhat elongated sheet metal loop, extending crosswise of the bolt 6, and the loop sides have alined apertures to take the shank of the bolt 6. One side of the loop 11 is substantially flat, to receive and seat the nut 9, while its other side 13 is bent or bowed outward, away from the flat side, to seat in the corrugation 10. Preferably, the bent side 13 of the loop 11 conforms to the hollow of the corrugation 10 in which it is seated, so as to fit the same closely.

As here shown, the loop 11 is formed of a strip of sheet metal (Fig. 3) bent as shown in Fig. 1, with its ends 14, 15 substantially flat and turned inward to lap one another in substantial or approximate parallelism. Preferably, bolt openings (round holes) 16, 17, 18 are made in the ends 14, 15 of the strip and in its intermediate portion 13 (approximately at mid-length) before the strip is bent,—as shown in Fig. 3. Bending of the strip to substantially the form shown in Fig. 1 brings all three of these holes 16, 17, 18 in line with one another. When the device 11 is put in place on the bolt 6 and the nut 9 screwed home and tightened, the flat ends 14, 15 tend to draw outward relative to each other, owing to the curvature of the opposite side 13 of the loop 11,—and this it will be obvious forces the side 13 to conform to the shape of the hollow corrugation 10, and also the outward drawing of the flat ends 14 and 15 will cause the edges of the bolt openings 16, 17 to engage the bolt 6 and "bite" into it or grip it under the nut. Even though the device 11 is not made of spring metal, it has sufficient resiliency to act as a cushion and obviate or minimize the danger of stripping of threads if the nut 9 is tightened a little too much. Its resilience also tends to prevent the nut 9 from unscrewing.

When screwed home and tightened properly, the nut 9 may be positively secured against loosening or working off by utilizing a portion of the device 11 as a nut lock. As shown in Figs. 1 and 2, this is done by bending or turning up the outer end 15 of the metal strip of which the device 11 is formed. To facilitate this, this end of the strip may be divided into separate tongue portions 19, 19 by a slot or notch 20, as shown in Fig. 3, so that either tongue 19, 19 may be turned up at a time. The slot 20 extends inward from the extreme edge of the end 15 towards the adjacent bolt hole 17, but stops short of this hole so as not to weaken this portion of the strip for gripping the bolt 6. The outer end 15 of the strip may advantageously be wider than the portion of the loop directly beneath it, so that a pair of pliers or other suitable tool can be conveniently applied to grasp the outer lateral edge of the tongue 19 which it is desired to turn up.

While great variation in outline of the strip or blank of which the device 11 is made is, of course, permissible, as shown in Figs. 2 and 3 it has straight lateral edges from end to end.

What is claimed is:

1. The combination with a corrugated sheet and a securing bolt therefor passing through a hollow of the corrugations, of a filler for seating in the hollow and engageable by a bolt abutment comprising a sheet metal loop with its opposite sides apertured to take the bolt.

2. The combination with a corrugated sheet and a securing bolt therefor passing through a hollow of the corrugations, of a filler for seating a bolt abutment in the hollow comprising a sheet metal loop with its opposite sides apertured to take the bolt, and a nut lock portion engaging the edge of said bolt abutment.

3. The combination with a corrugated sheet and a securing bolt therefor passing through a hollow of the corrugations, of a filler for seating a bolt abutment in the hollow comprising a looped sheet metal strip with substantially flat parallel ends turned inward so that both may engage the bolt beneath its abutment, and with intermediate portion bowed outward to seat in the corrugation and apertured to take the bolt.

4. The combination with a corrugated sheet and a securing bolt therefor passing through a hollow of the corrugations, of a filler for seating a bolt abutment in the hollow comprising a looped sheet metal strip apertured at opposite sides of the loop to take the bolt, and having its ends lapped at the side of the loop engaged by the bolt abutment.

5. The combination with a corrugated sheet and a securing bolt therefor passing through a hollow of the corrugations, of a filler for seating a bolt abutment in the hollow comprising a looped sheet metal strip apertured at opposite sides of the loop to take the bolt, and having its ends lapped at the side of the loop engaged by the bolt abutment, one end of the strip being bent up to lock the bolt abutment.

6. The combination with a corrugated sheet and a securing bolt therefor passing through a hollow of the corrugations, of a filler for seating a bolt abutment in the hollow comprising a sheet metal strip having bolt openings in its ends and in its intermediate portion, and bent to a loop with the said openings all in line to take the bolt.

7. The combination with a corrugated sheet and a securing bolt therefor passing through a hollow of the corrugations, of a filler for seating a bolt abutment in the hollow comprising a looped sheet metal strip with substantially flat ends lapped and apertured at the side of the loop engaged by the bolt abutment, and with intermediate portion bent to seat in the corrugation and apertured in line with the first mentioned apertures, to take the bolt.

8. A device of the character described comprising a sheet metal strip with substantially flat, parallel ends turned inward so that both may engage a bolt and provide a bearing surface for an abutment thereon, and with bolt-apertured intermediate portion bowed outward away from said ends to seat in a recess of the same contour.

9. A device of the character described comprising a sheet metal strip having bolt openings in its ends and in its intermediate portion, and bent to a loop with its ends lapped to bring their openings in line with one another and with that in said intermediate portion, the loop being arranged to be seated in a recess of the same contour as the recess with the lapped ends disposed beyond the recess to form a bearing surface for an abutment on the bolt.

10. A device of the character described comprising a sheet metal strip having bolt openings in its ends and in its intermediate portion, and bent to a loop for seating in a recess and having its ends lapped to bring their openings in line with one another to form a bearing surface for a nut engaged with the bolt, the outer lapping end of the strip being divided lengthwise of the strip to facilitate bending up of a portion to lock the nut against rotation.

11. A device of the character described comprising a sheet metal strip having bolt openings in its ends and in its intermediate portion, and bent to a loop with its intermediate portion bowed outward for seating in a recess and having its ends flat and lapped to bring their openings in line with the intermediate opening and forming a yieldable abutment for a nut engaged on the bolt, the threading of the nut against the yieldable abutment causing the walls of the end openings to bite the bolt and hold it against rotation.

12. A corrugated sheet clamping device, including a length of sheet metal longitudinally bowed intermediate its ends to fit within one of the corrugations of the sheet, and having its end portions bent in overlapping relation and arranged to be engaged by a nut threaded upon a bolt passing through the sheet.

13. A fastening device comprising a threaded element to pass through a recessed object, and a self-conforming clamping element shaped to seat in the recess to clamp the object, and actuate it to clamped position when the threaded element has been threaded home.

14. A fastening device for securing an irregularly surfaced element to a support, including a threaded element to extend through the support and irregularly surfaced element, and a self-conforming clamping element mounted on the threaded element and having one side flattened and adapted to be engaged by an abutment on the threaded element to hold the clamping element in clamped self-conformed engagement with the irregularly surfaced element.

15. In a corrugated sheet fastening, a perforated looped clamping member arranged to be received on the end of a bolt passed through the sheet and held in clamping engagement with the latter by a nut threaded on the bolt.

16. In a corrugated sheet fastening, a bolt extending through the sheet and a follower mounted on said bolt and interposed between an abutment thereof and the sheet, said follower being so formed as to be self-conforming under pressure to the surface of the sheet.

17. A fastening device comprising a threaded element to pass through a recessed object, and a clamping element self-conforming under pressure and shaped to seat in the recess to clamp the object and to retain the same in clamped position when the threaded element has been threaded home.

In witness whereof I have hereunto set my hand.

JOSEPH C. ABEL.